United States Patent
Cariccia et al.

(10) Patent No.: US 12,379,018 B2
(45) Date of Patent: Aug. 5, 2025

(54) FILTERING PULLEY, SYSTEM COMPRISING SUCH PULLEY AND RELATED CONTROL METHOD

(71) Applicant: DAYCO EUROPE S.R.L., Chieti (IT)

(72) Inventors: Gianluca Cariccia, Chieti (IT); Andrea Guala, Chieti (IT); Federico Domenico Licata, Chieti (IT); Marco Cipelli, Chieti (IT); Markus Armbrust, Chieti (IT); Gregorio Luciani, Chieti (IT)

(73) Assignee: MUVIQ S.R.L., Ivrea (IT)

( * ) Notice: Subject to any disclaimer, the term of this patent is extended or adjusted under 35 U.S.C. 154(b) by 496 days.

(21) Appl. No.: 17/997,251

(22) PCT Filed: Apr. 28, 2021

(86) PCT No.: PCT/IB2021/053527
§ 371 (c)(1),
(2) Date: Oct. 27, 2022

(87) PCT Pub. No.: WO2021/220189
PCT Pub. Date: Nov. 4, 2021

(65) Prior Publication Data
US 2023/0167883 A1   Jun. 1, 2023

(30) Foreign Application Priority Data

Apr. 28, 2020   (IT) .................. 102020000009295

(51) Int. Cl.
*F16H 7/08* (2006.01)
*B60K 6/387* (2007.10)
(Continued)

(52) U.S. Cl.
CPC ........... *F16H 7/0827* (2013.01); *B60K 6/387* (2013.01); *F16D 27/118* (2013.01);
(Continued)

(58) Field of Classification Search
CPC .... F16D 27/112; F16D 27/118; F16D 48/064; F16D 2500/1022; F16D 2500/10418;
(Continued)

(56) References Cited

U.S. PATENT DOCUMENTS 3,831,723 A * 8/1974 Briar ................ F16D 27/105
192/81 C
3,865,222 A * 2/1975 Briar ................ H02K 49/106
464/46
(Continued)

OTHER PUBLICATIONS

PCT/IB2021/053527, International Search Report and Written Opinion, Aug. 2, 2021 (21 pages).

*Primary Examiner* — Henry Y Liu
(74) *Attorney, Agent, or Firm* — FisherBroyles, LLP; Susan M. Oiler (57) ABSTRACT

A filtering pulley has a hub configured to be fixed to a shaft for rotation thereabout, a crown mounted coaxial and rotationally free on the hub, and a plurality of elastic groups arranged circumferentially with respect to the hub and to the crown and interposed, each, between a pair of first elements integral with the hub and between a pair of second elements integral with the crown. The first elements have at least two spokes, carried by an actuator that is made of two portions that can be selectively coupled based on angular position data between the crown and the hub and/or based on data of torque transmitted between the different elements of the system comprising this pulley.

15 Claims, 9 Drawing Sheets

(51) Int. Cl.
*F16D 27/118* (2006.01)
*F16D 48/06* (2006.01)
*F16H 55/36* (2006.01)

(52) U.S. Cl.
CPC ......... *F16D 48/064* (2013.01); *F16H 7/0829* (2013.01); *F16H 55/36* (2013.01); *B60Y 2200/92* (2013.01); *B60Y 2300/42* (2013.01); *B60Y 2400/48* (2013.01); *F16D 2500/1022* (2013.01); *F16D 2500/10418* (2013.01); *F16D 2500/1107* (2013.01); *F16D 2500/3065* (2013.01); *F16H 2055/366* (2013.01)

(58) Field of Classification Search
CPC ..... F16D 2500/1107; F16D 2500/3065; F16D 2001/103; F16H 2055/366; F16H 55/36; F16H 7/0827; F16H 7/0829; B60K 6/387; B60Y 2200/92; B60Y 2300/42; B60Y 2400/48; F16F 15/123; F16F 2230/0041; F16F 2230/08; F16F 15/13121; Y02T 10/62
USPC .......................................................... 474/94
See application file for complete search history.

(56) References Cited

U.S. PATENT DOCUMENTS

| | | | | |
|---|---|---|---|---|
| 4,201,281 A * | 5/1980 | MacDonald | ......... | F16D 27/105 192/81 C |
| 4,262,787 A * | 4/1981 | Takefuta | ............ | F16D 27/105 192/84.81 |
| 4,273,226 A * | 6/1981 | Takefuta | ............ | F16D 27/105 192/84.81 |
| 4,287,976 A * | 9/1981 | Sakaki | ................ | B60H 1/3222 474/902 |
| 4,418,811 A * | 12/1983 | MacDonald | ............ | F16D 67/02 192/81 C |
| 4,466,522 A * | 8/1984 | Shibuya | ............... | F16D 27/105 192/81 C |
| 4,619,351 A * | 10/1986 | Takatoshi | ............ | F16D 27/105 192/81 C |
| 4,674,612 A * | 6/1987 | Ogura | ..................... | F16H 3/54 192/81 C |
| 4,949,828 A * | 8/1990 | Olsen | ................... | F16D 48/064 192/30 W |
| 6,169,347 B1 * | 1/2001 | Sakamoto | ............... | F16D 27/06 310/78 |
| 6,494,799 B1 * | 12/2002 | Ochiai | ................... | F16D 7/044 474/94 |
| 6,915,887 B2 * | 7/2005 | Faller | ..................... | F16D 27/004 192/48.2 |
| 7,121,947 B2 * | 10/2006 | Ueda | ..................... | F16D 7/024 464/10 |
| 8,231,488 B2 * | 7/2012 | Amati | ................. | H02K 7/1016 474/166 |
| 8,434,210 B2 * | 5/2013 | Pfleger | ................ | H02K 7/1004 310/263 |
| 8,485,331 B2 * | 7/2013 | Parsons | ................ | F16D 27/112 192/81 C |
| 8,951,153 B2 * | 2/2015 | Ishida | .................... | F16D 43/18 474/94 |
| 9,556,918 B2 * | 1/2017 | Staniewicz | .......... | F16D 48/064 |
| 9,989,103 B2 * | 6/2018 | Antchak | ............ | F16H 55/36 |
| 10,030,757 B2 * | 7/2018 | Manzoor | ............. | F16H 55/36 |
| 10,066,538 B2 * | 9/2018 | Zhu | ........................ | F01P 7/164 |
| 10,364,854 B2 * | 7/2019 | Staniewicz | ............ | F16D 48/06 |
| 10,520,043 B2 * | 12/2019 | Hornbrook | ............. | F02B 33/38 |
| 10,697,531 B2 * | 6/2020 | Wick | ...................... | F16H 55/36 |
| 2008/0017468 A1 * | 1/2008 | Krafft | ..................... | F01P 5/12 192/40 |
| 2009/0105021 A1 * | 4/2009 | Amati | ................. | H02K 49/046 474/94 |
| 2010/0230227 A1 * | 9/2010 | Parsons | ................ | F16D 27/105 192/65 |
| 2012/0149511 A1 * | 6/2012 | Hodjat | ............... | F16F 15/1215 474/94 |
| 2016/0040733 A1 * | 2/2016 | Staniewicz | ........... | B60K 25/02 701/67 |
| 2016/0195162 A1 * | 7/2016 | Manzoor | ............. | F16F 15/1442 474/166 |
| 2016/0298527 A1 * | 10/2016 | Zhu | ........................ | F01P 11/16 |
| 2017/0102040 A1 * | 4/2017 | Staniewicz | ........... | B60K 25/02 |

* cited by examiner

FILTERING PULLEY, SYSTEM COMPRISING SUCH PULLEY AND RELATED CONTROL METHOD

CROSS-REFERENCE TO RELATED APPLICATIONS

The present invention is filed under 35 U.S.C. § 371 as the U.S. National Phase of International Patent Application No. PCT/IB2021/053527, filed Apr. 28, 2021, which designated the United States and which claims the benefit of Italian patent application no. 102020000009295, filed on Apr. 28, 2020, the entire disclosure of which is incorporated herein by reference.

TECHNICAL FIELD

This invention relates to a filtering pulley, preferably a pulley for a crankshaft in an accessory drive of an internal combustion engine, and a corresponding control system and method thereof.

STATE OF THE PRIOR ART

As is well known, the drive shaft in internal combustion engines is subject to torsional vibration due to periodic stresses caused by combustion in the cylinders. These vibrations are particularly intense upon start-up and at low engine speeds, as well as in the presence of special design solutions such as the use of dual-clutch gearboxes, start-stop or hybrid systems.

Torsional vibrations result in irregularities in the rotation of the drive pulley of the accessory transmission that are transmitted to the accessories via the transmission belt, which is, therefore, subject to periodic changes in tension.

In order to "filter" the torsional oscillations transmitted from the crankshaft to the belt, a filtering pulley provided with a hub integral with the drive shaft, a crown cooperating with the belt, and one or more elastic elements through which the driving torque is transmitted from the hub to the crown, is generally used as a drive pulley.

Additionally, in hybrid systems, the need is felt to have to decouple the crankshaft from the rest of the transmission. An example of this requirement is given by the use of the air conditioning system, even with the engine off, whose compressor is coupled to the transmission and is driven by one or more electric motor-generators configured to generate torque, instead of absorbing it as usual. In this condition, the inertia of the thermal combustion engine would result in a passive load that therefore tends to reduce the efficiency of the transmission system by consuming energy.

Systems are known that decouple the pulley from the crankshaft of the internal combustion engine when the electric motor is active and the internal combustion engine is not being used.

However, these systems are particularly complex and cumbersome and, therefore, costly. Furthermore, known methods for controlling these systems are not particularly efficient in coupling and decoupling this pulley. These inefficiencies generate noises, shocks and, above all, limit the fatigue life of the pulley itself leading to sudden breakages.

The purpose of this invention is to produce a filtering pulley that solves the above-mentioned technical problem in a simple and economical way.

SUMMARY OF THE INVENTION

The above-mentioned purpose is achieved with a filtering pulley, a transmission system, and a control method according to the appended claims.

BRIEF DESCRIPTION OF THE DRAWINGS

In order to better understand this invention, a non-limiting preferred embodiment thereof will now be described by way of example with reference to the accompanying drawings, in which.

DETAILED DESCRIPTION OF THE INVENTION

Figure 1:
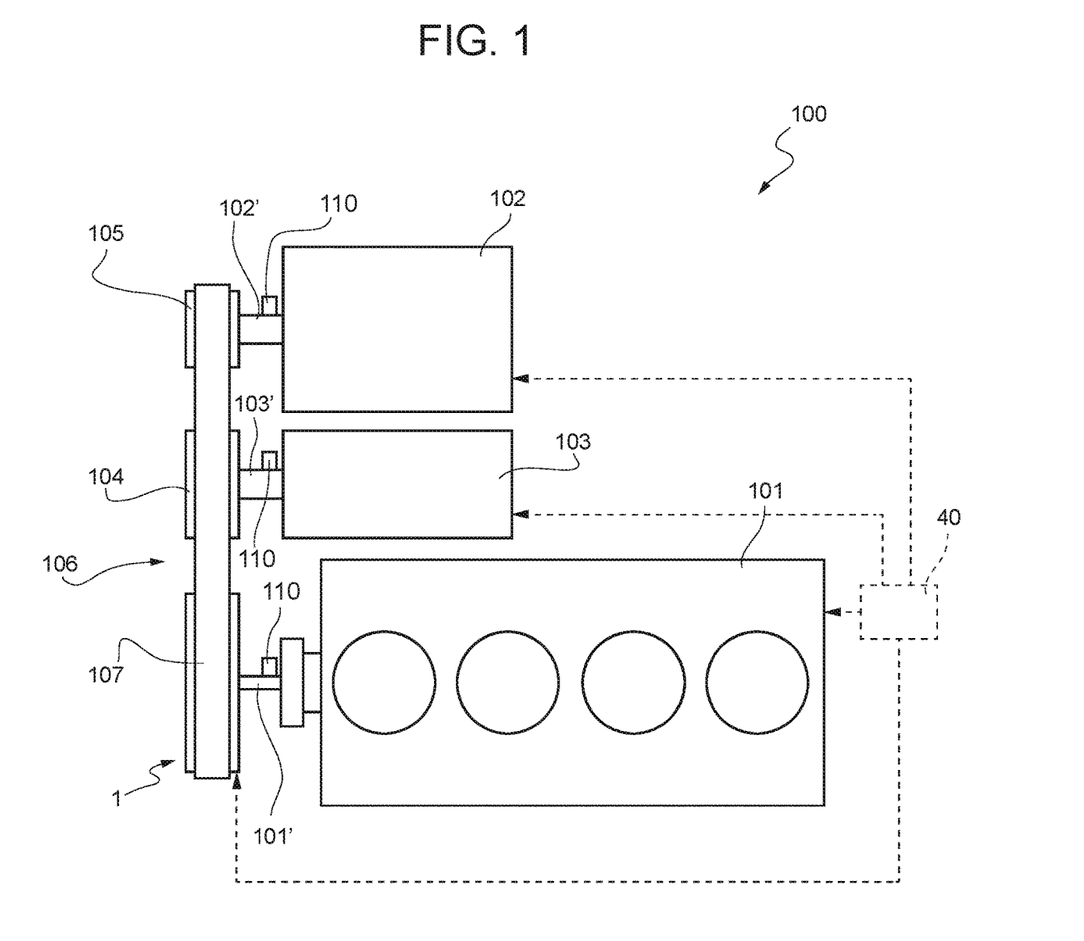
FIG. 1 is a schematic representation of a transmission system according to one aspect of this invention.

FIG. 1 depicts a transmission system 100 of a vehicle essentially comprising an internal combustion engine 101, at least one electric motor/generator 102, and at least one accessory element 103, such as, for example, a compressor of a vehicle air conditioning circuit or a water pump.

Each of the internal combustion engine 101, the electric motor/generator 102, and the accessory element 103 comprises a corresponding shaft 101', 102', 103' to which a pulley is coupled, in particular a pulley 1 according to the invention for the internal combustion engine 101, and corresponding pulleys 104, 105, for example known ones, for the electric motor/generator 102 and the accessory element 103.

The transmission system 100 comprises an endless transmission element 106, for example a belt 107, preferably a poly-V or toothed belt, configured to cooperate with the pulleys 1, 104, and 105 to allow transmission of torque between the internal combustion engine 101, the electric motor 102, and the accessory element 103, which is known.

Figure 2:
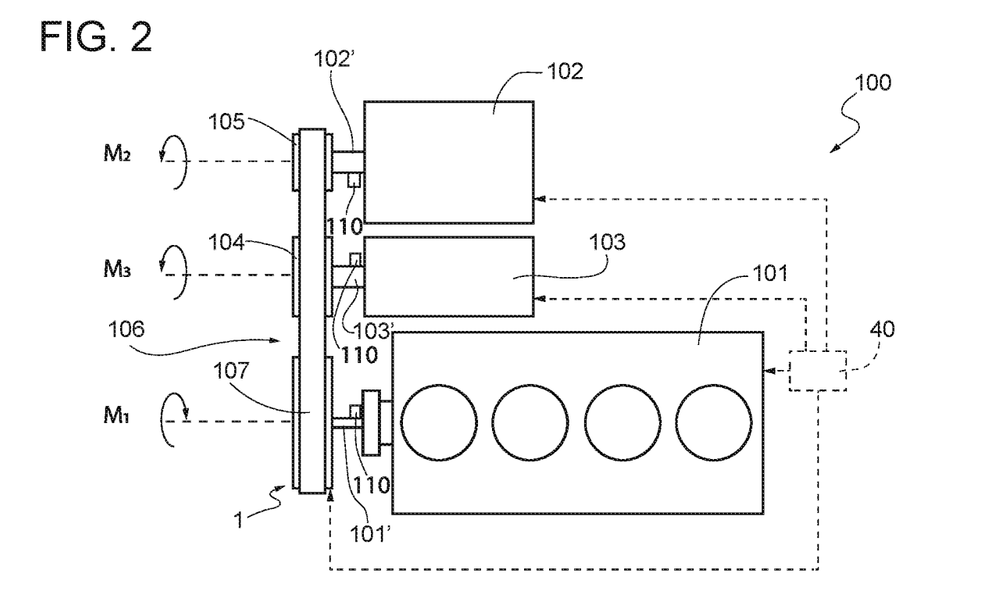
FIG. 2 is a schematic representation of the transmission system in FIG. 1 in a first operating condition according to a control method according to this invention.
Figure 3:
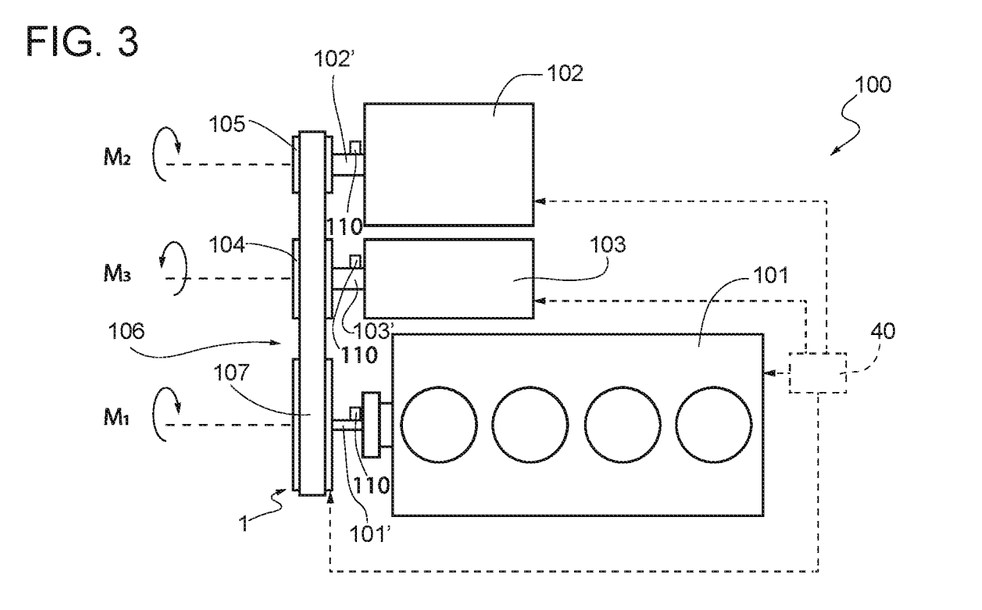
FIG. 3 is a schematic representation of the transmission system in FIG. 1 in a first operating condition according to a control method according to this invention.
Figure 4:
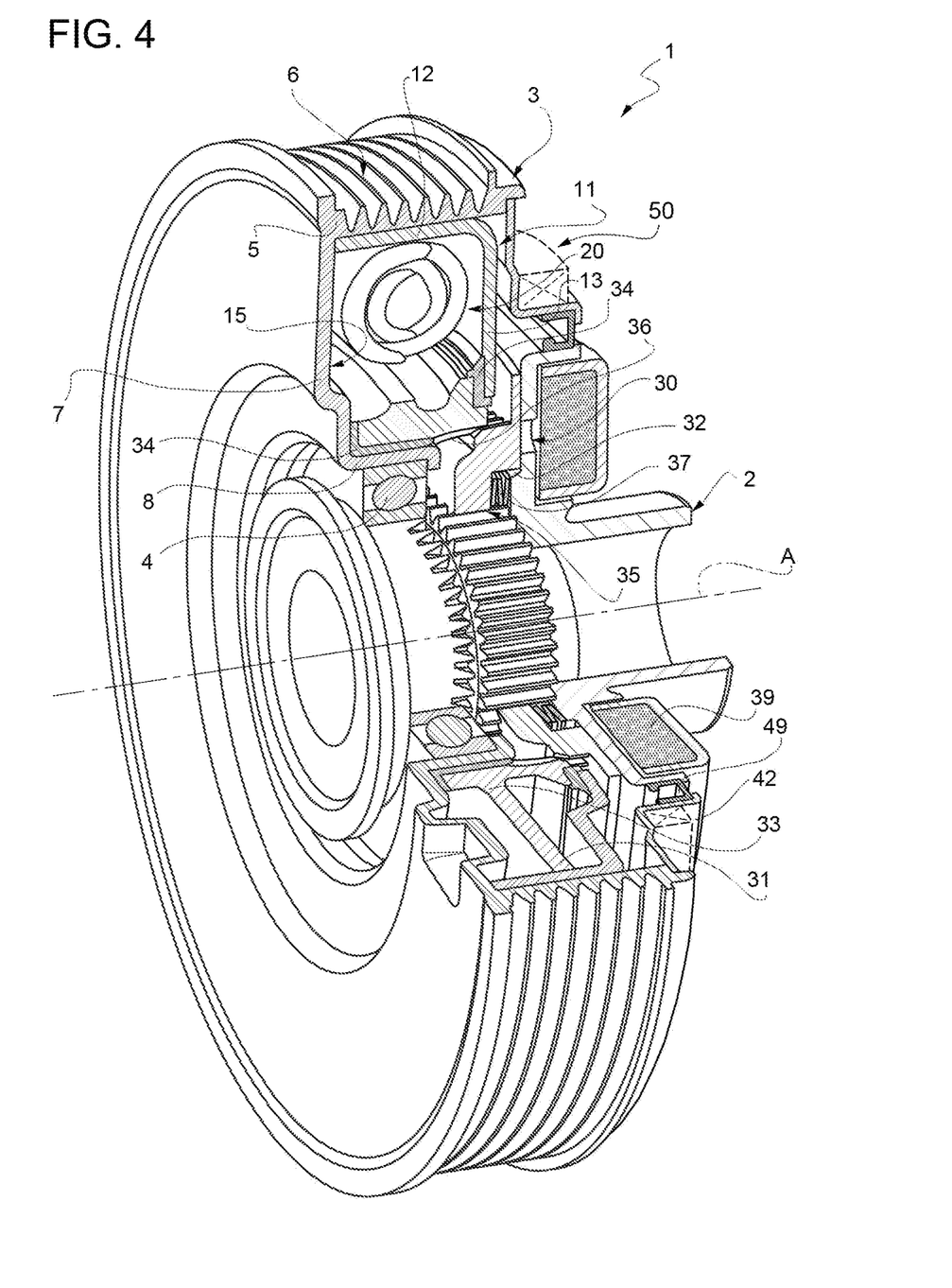
FIG. 4 is a perspective and partially sectioned view of a pulley according to the invention with parts removed for clarity.

FIGS. 2 to 4 show a filtering pulley 1 comprising a hub 2 of axis A, designed to be connected to the shaft 101', i.e. to the crankshaft of the internal combustion engine 101, and an annular crown 3 externally coaxial to the hub 2 and rotationally freely supported on the hub 2 with rolling means 4 such as a bearing, preferably a rolling bearing.

The crown 3 comprises an annular portion 5 provided with a profile 6 designed to cooperate with a poly-V belt (not shown). The crown 3 also comprises a radial wall 7, integral with the annular portion 5 and preferably of one piece with it, extending radially towards the hub 2, and a basically cylindrical inner wall 8 of axis A.

The crown 3 carries, integral thereto, a closure element 11 comprising an outer cylindrical wall 12 of axis A and a flat radial annular wall 13 extending radially and cantilevered from the wall 12 towards the axis A.

The closure element 11 is planted in the crown 3 so as to form an annular chamber 15 radially interposed between one wall 12 and another wall 8 and axially bounded by one wall 7 and another wall 13. Finally, the closure element 11 comprises two diametrically opposed projections 16, 17 extending axially within the chamber 15 from the wall 13.

The wall 7 of the crown 3 forms projections (not illustrated) corresponding to and facing the projections 16, 17 of the closure element 11.

The pulley 1 may also be provided with a dynamic damper, of a known type and not illustrated, integral with the hub 2 and not described for brevity. In addition, the pulley 1 comprises multiple, for example two, arched elastic groups 20 circumferentially arranged free in the corresponding portions 15a, 15b of the chamber 15 bounded by the projections 16 and 17. The stroke of the elastic groups 20 in the corresponding portions 15a, 15b is given by an angular play a between each of the elastic groups 20 arranged in contact with one of the projections 16, 17 and the other projection 17, 16.

Each of the elastic groups 20 preferably comprises a pair of arched coil springs 21, 22 advantageously, but not necessarily, placed in series with each other.

Even more preferably, each elastic group 20 is mounted between respective end pads 23 and, optionally, an intermediate pad 24.

If there are two springs 21, 22, they have different stiffnesses, more precisely greater and lesser as will be better described below.

The pads 23 preferably each comprise an arched portion 25 internally surrounding an end portion of the corresponding spring 21, 22, and a head 26 defining an axial support for this end portion. The pad 24 comprises an arched portion 27 that internally surrounds respective opposite end portions of the springs 21, 22 and an intermediate radial baffle 48 between the two springs 21, 22.

Finally, the pulley 1 comprises an actuator 30 carried by the hub 2, as described below. The actuator 30 has two spokes 31 that are free to move circumferentially in the chamber 15 and are designed to interact with the elastic groups 20. Assuming that the actuator 30 is arranged so that each of the spokes 31 is angularly equidistant in relation to the elastic groups 20, the angle between each of the spokes 31 and each of the elastic groups 20 will be equal to $\theta/2$, where $\sigma$ represents the total angular play between the spokes 31 and the elastic groups 20.

Thus, the hub 2 and the crown 3 can rotate with respect to each other without any torque transmission for an angular range, or free angle, equal to the sum of the angular plays $\alpha$ and $\sigma$ described above.

Figure 5:
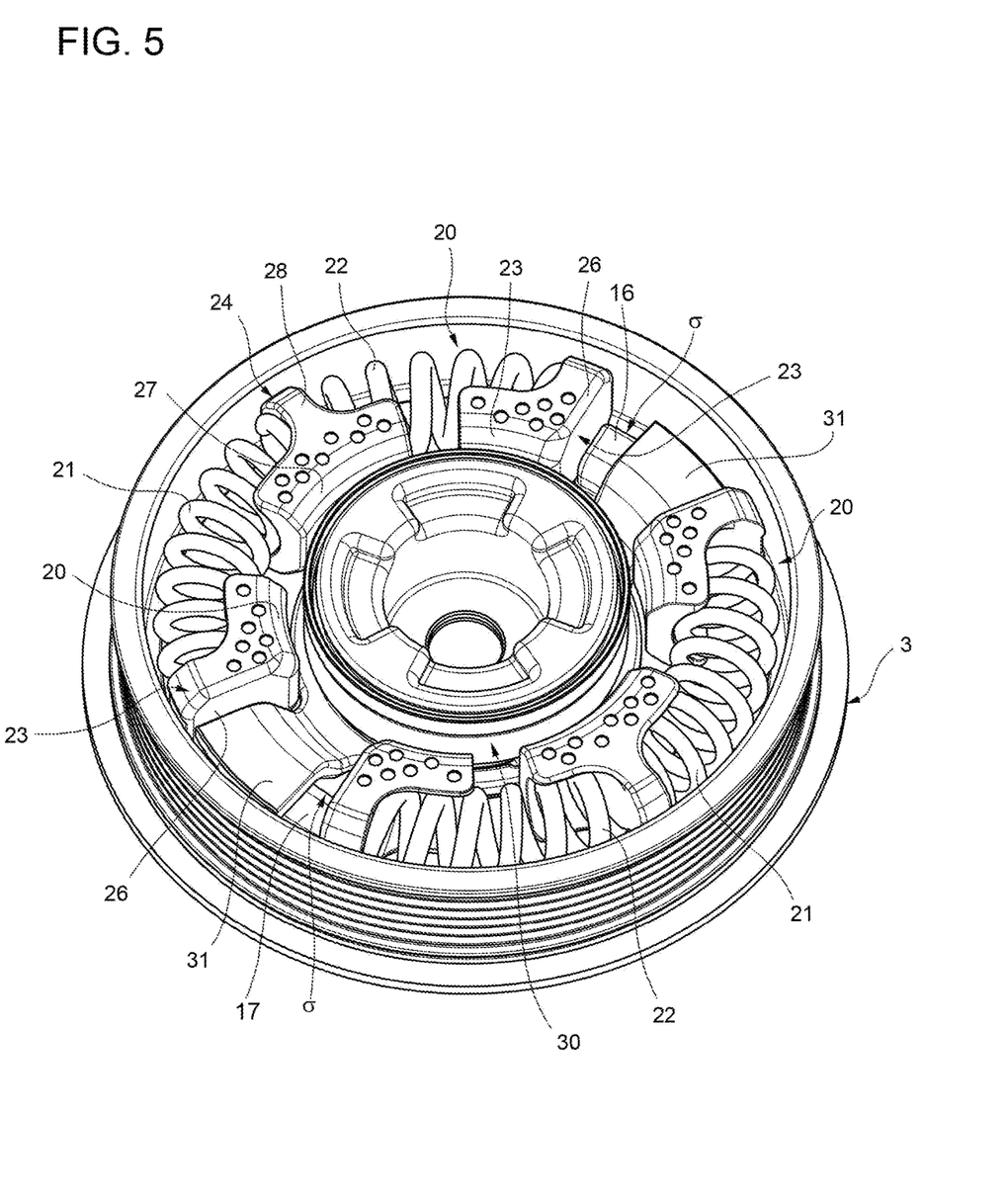
FIG. 5 is a perspective view, with parts removed for clarity, of a portion of the pulley in FIG. 4.
Figure 6:
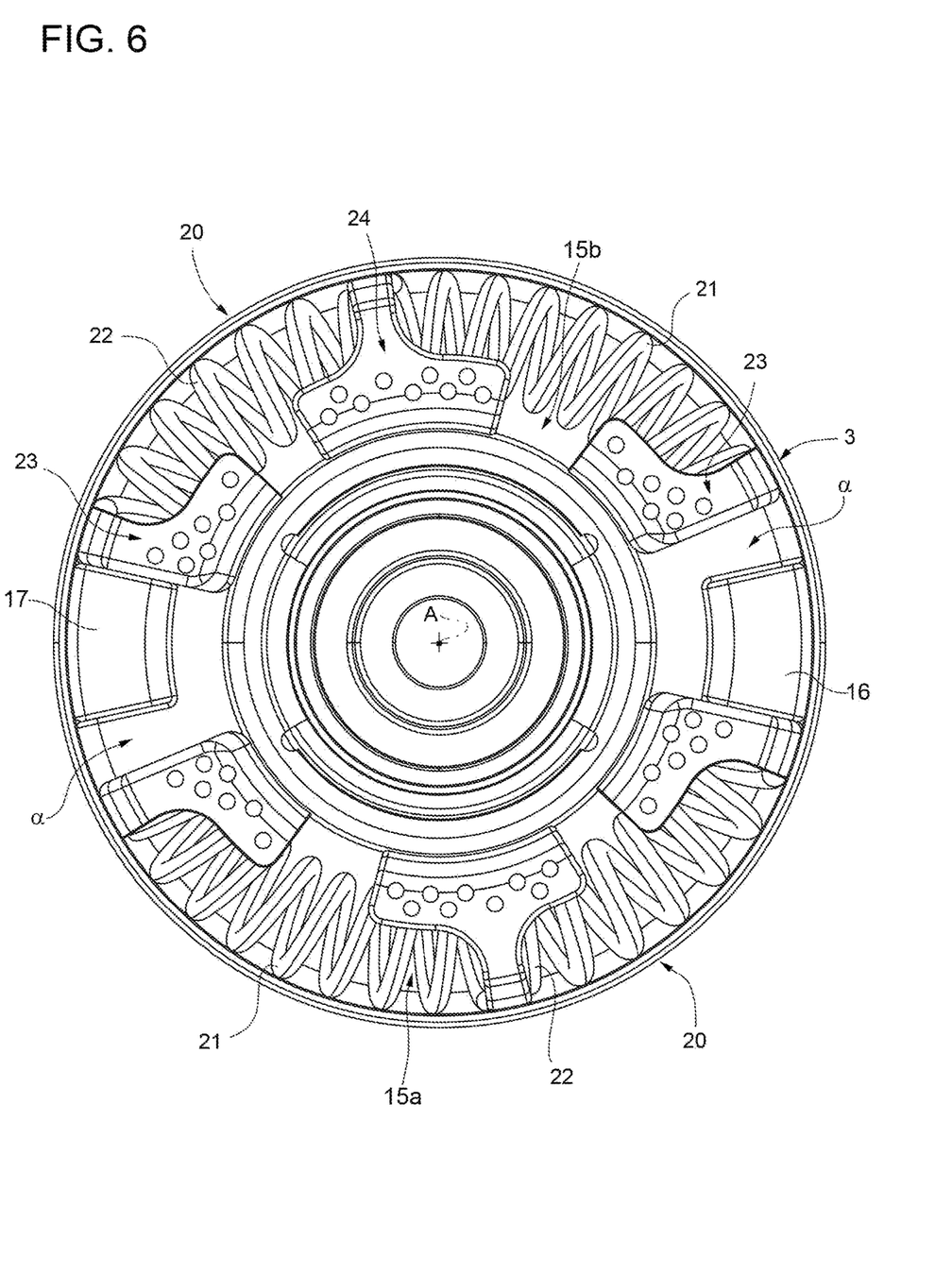
FIG. 6 is a front view of the pulley in FIG. 4, with some parts removed for clarity.

Furthermore, as can be seen in FIGS. 5 and 6, the spokes 31 are placed radially coincident with the rolling means 4 and also advantageously coincident with the centreline of the portion 6, in order to minimise tilting torques in the pulley 1.

The actuator 30 preferably comprises a coupling portion 32 carried by the hub 2 and an actuating portion 33 carrying the above-mentioned spokes 31. The coupling portion 32 and the actuating portion 33 are configured so that they can be selectively coupled so that, in a first operating condition, the coupling portion 32, driven by the hub 2, is integrally coupled to the actuating portion 33 so that the latter is also driven by the hub and so that, in a second operating condition, the coupling portion 32 is operationally separated from the actuating portion 33 so that the actuating portion 33 cannot transmit torque with respect to the hub 2.

Advantageously, the coupling portion 32 is configured to move with respect to the hub 2 along the axis A but fixed with respect to rotation with respect to the latter, while the actuating portion 33 is configured to be carried rotationally free by the crown 3 around the axis A but fixed with respect to translation along the latter.

The actuating portion 33 is, preferably, basically annular in shape, thus defining an outer surface from which the spokes 31 project and an inner surface having a larger diameter than the wall 8 so as to radially surround it.

Consistent with the described embodiment, the actuating portion 33 is rotationally freely supported, at least radially, by one wall 8 and, at least axially, by another wall 13. Such rotationally free support is advantageously achieved by means of corresponding support means 34 such as rotating plastic support bushings or rings, interposed between the actuating portion 33 and one wall 8 and between the actuating portion 33 and another wall 13, respectively.

Advantageously, the coupling portion 32 is free to move on the hub 2 by means of a splined coupling 35 made between the hub 2 and the coupling portion 32. The latter preferably has a basically annular shape about the axis A, the inner diameter of which is of such a size that it externally surrounds the hub 2.

The splined coupling 35 is therefore made between an inner surface of the coupling portion 32 and an outer surface of the hub 2 so that a number of teeth extending from either the coupling portion 32 or the hub cooperate with respective seats made in the other of the latter. In the described embodiment, the hub 2 defines the number of teeth while the coupling portion 32 defines the number of seats within which the teeth may cooperate.

The coupling portion 32 and the actuating portion 33 selectively cooperate by means of a shape coupling such as a splined coupling 36 that can be geared in a first condition in which the coupling portion 32 is placed at a minimum distance relative to the axial position of the spokes 31 and cannot gear in a second condition in which the coupling portion 32 is placed at a maximum distance relative to the axial position of the spokes 31.

The coupling portion 32 is kept in the first condition by a force imparted by elastic means 37, preferably axially interposed between the hub 2 and the coupling portion 32. These elastic means may, advantageously, comprise a Belleville washer.

The coupling portion 32 is actuated in its movement along the axis A on the hub 2 by actuating means 38 configured to impart a greater force than that exerted by the elastic means 37.

These actuating means 38 preferably comprise magnetic attraction means such as an electromagnet 39 electrically connected to an electrical power source, such as a battery (not shown) or the motor-generator 102. Accordingly, the decoupling portion 32 is made of material that means it is affected by the magnetic field of the electromagnet 39, for example ferromagnetic material.

The actuating means 38 are also electrically connected to an electronic unit 40 configured to control their operation to enable the coupling portion to pass between the two conditions.

The electronic unit 40 may be the vehicle ECU or the internal combustion engine 101 and is electrically connected to the motor/generator 102, to sensors (not shown) configured to detect operational parameters of the internal combustion engine 101, and/or to the element 103.

The electronic unit 40 comprises processing means configured to: detect signals from the elements to which it is electrically connected; process such signals, potentially by storing them or using data previously stored therein; and send control signals for the above-mentioned elements based on the processing mentioned earlier.

The actuating means 38 are advantageously carried by the hub 2, which is preferably made in two portions 2a, 2b rigidly connected to each other, for example one planted on top of the other. According to the illustrated embodiment, the hub portion 2a supports the rolling means 4 and the actuator 30, while the portion 2b is configured to support the actuating means 38.

The portions 2a, 2b of the hub 2 are preferably substantially similar in shape to one another; in addition, the portion 2b comprises a flange 2c extending radially cantilevered from an annular body end edge of the portion 2b. This end edge is the edge cooperating in contact with the portion 2a to enable rigid connection thereof.

According to the configuration described above, the above-mentioned elastic means 37 are advantageously axially interposed between the flange 2c and the coupling portion 32 while the actuating means 38 are always carried by the flange 2c but on the opposite side with respect to the elastic means 37. To this end, the flange 2c defines a seat 41, advantageously annular, configured to accommodate the electromagnet 39, which is also, advantageously, annular.

According to the above-described configuration, therefore, the decoupling portion 32 in the first operating condition described above is placed at a maximum distance with respect to the flange 2c and in the second condition in which the coupling portion 32 is placed at a minimum distance with respect to the flange 2c, in better contact therewith.

In addition, the pulley 1 comprises a cover 42 configured to cooperate in contact between the crown 3 and the hub 2 so as to prevent communication with the outside of the above-mentioned elements. According to the described embodiment, all the functional elements described except the electromagnet 2 are isolated from the external environment by means of the cover 42, so that the oil contained inside the pulley 1 to allow lubrication of the above-mentioned elements does not contaminate/leak to the outside.

Advantageously, the cover 42 is fixed, for example by pressure, on the crown 3 while it is supported so that it slides on the hub 2. In particular, the cover 42 may comprise an annular wall 43 cooperating in contact with the portion 5 of the crown 3 and a cylindrical wall 44 extending cantilevered from the inner radial edge of the annular wall 43 and configured to cooperate, sliding, with the flange 2c of the hub 2. The sliding cooperation can be achieved by means of a rotating sealing ring 45.

The pulley 1 may also comprise a damper configured to dampen relative oscillations between the hub 2 and the crown 3 but not additionally described herein for brevity.

Figure 7:
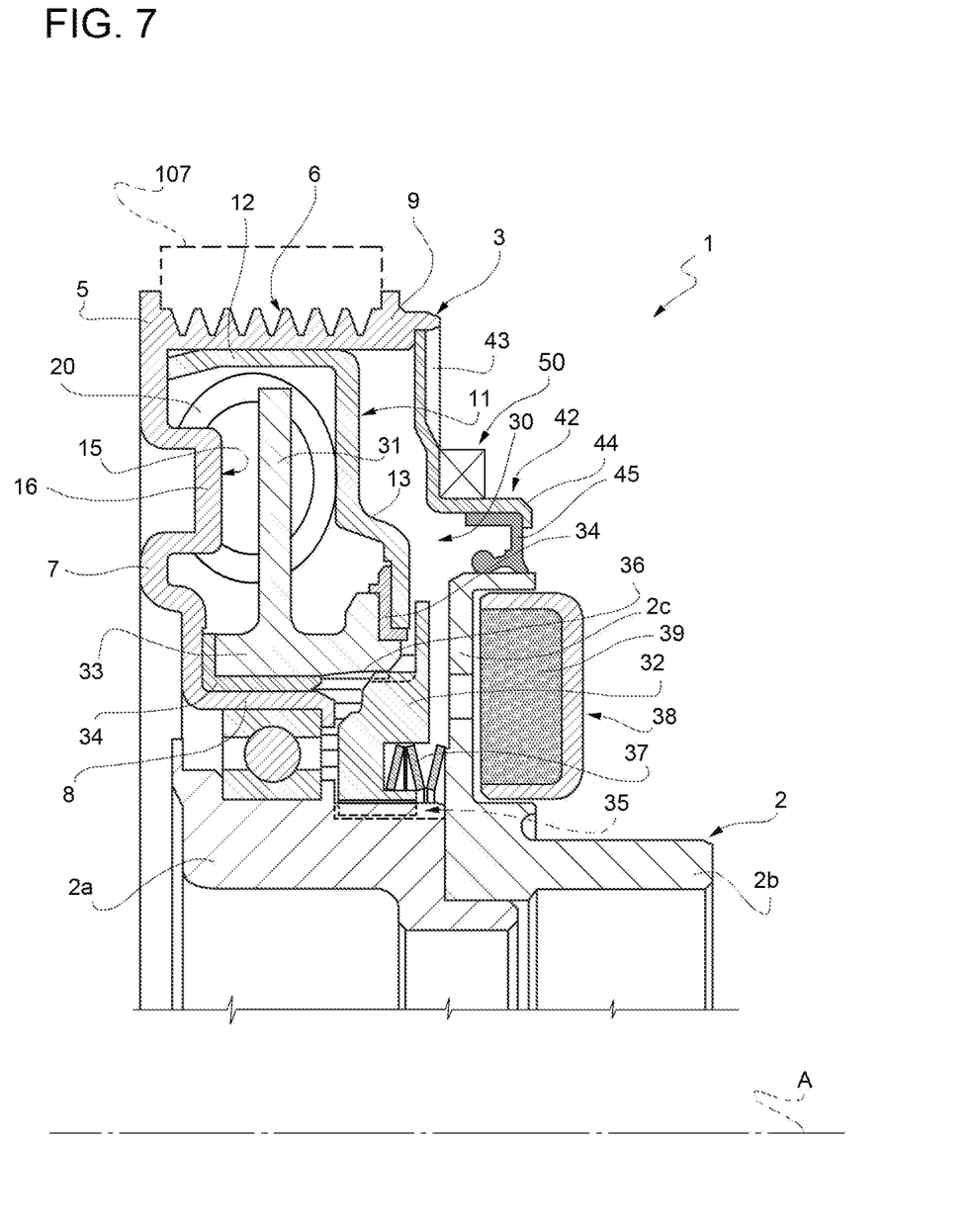
FIG. 7 is a diameter cross-section view of a portion of the pulley according to the invention in a first operating condition.
Figure 8:
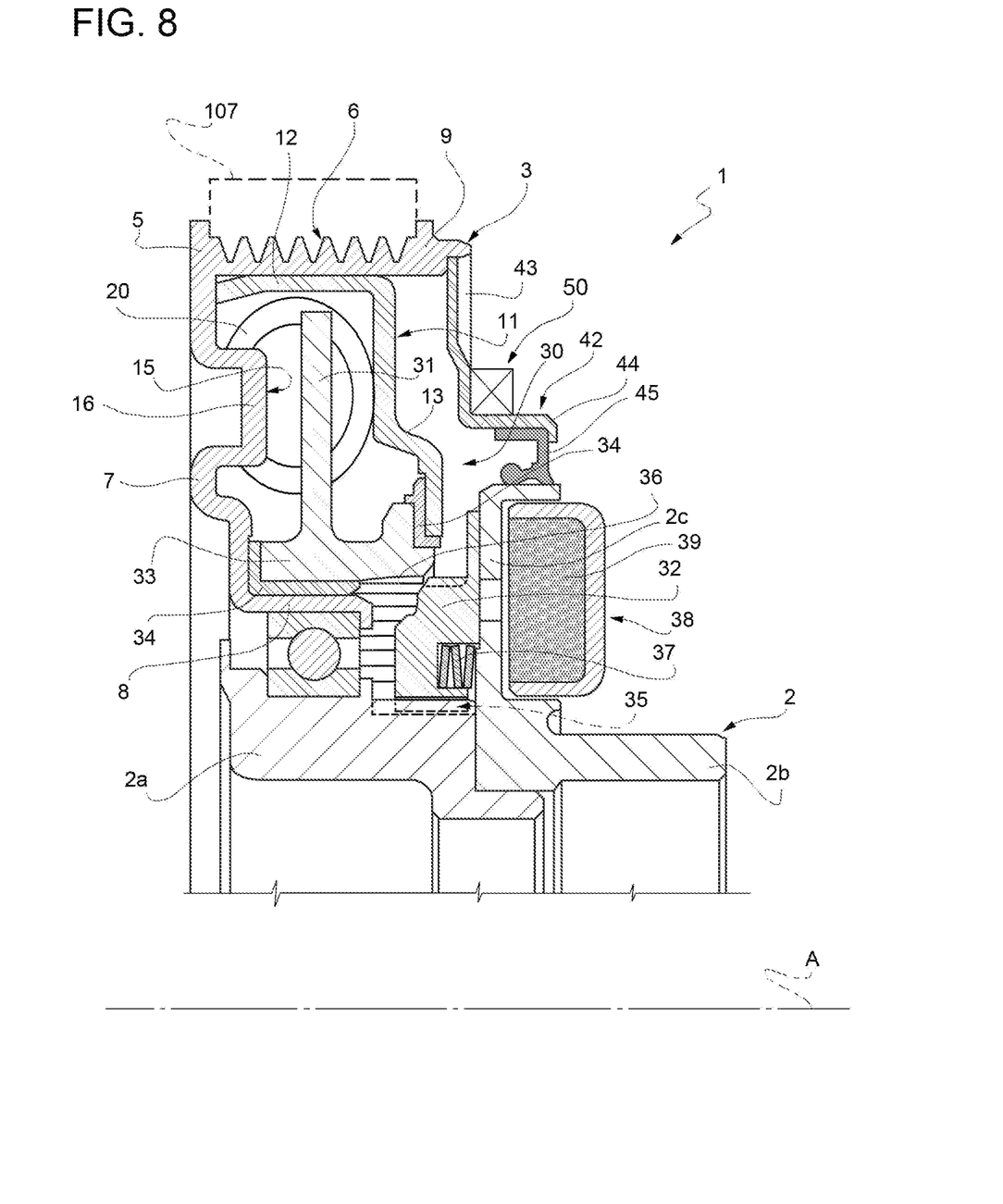
FIG. 8 is a diameter cross-section view of a portion of the pulley according to the invention in a first operating condition.

According to one aspect of the invention, the pulley 1 comprises angular sensor means 50 configured to detect the relative angular position between the coupling portion 32 and the actuating portion 33, i.e. of the crown 3 relative to the hub 2. These angular sensor means 50, schematically shown in FIGS. 4, 7, and 8, may, preferably, comprise an encoder or any other means configured to detect relative rotation between the crown 3 and hub 2. These angular sensor means 50 may be carried by the crown 3 or the hub 2 and are electrically connected to the electronic unit 40 so as to communicate the data acquired relating to the relative rotation between the crown 3 and the hub 2. The diagram shown is clearly illustrative, and it is obviously possible to position the angular sensor means 50 in any way to directly detect or indirectly infer the relative angular position between the coupling portion 32 and the actuating portion 33.

According to another aspect of the invention, the transmission system 100 comprises, alternatively or in combination with the preceding angular sensor means 50, torque sensing means 110 configured, respectively, to detect the torque exerted by the shafts 101', 102', 103' and, thus, by the internal combustion engine 101, the motor/generator 102, and the functional element 103.

These torque sensing means 110, schematically shown in FIGS. 1, 2, and 3, may be torque transducers carried by the shafts 101', 102', 103' or may be any other type of sensor configured to provide data designed to process the torque output from the shafts 101', 102', 103' and, thus, provided to the endless transmission element 106.

These sensor means 110 are electrically connected to the electronic unit 40 so as to communicate data acquired relating to the torque exerted by the shafts 101', 102', 103'.

The operation of a pulley 1 as described above is as follows.

In the first condition in which the coupling portion 32 is operationally connected to the actuating portion 33, the torque between hub 2 and crown 3 may be transmitted according to different system 100 operation phases. This configuration can be used for normal system operation 100, wherein the internal combustion engine 101 provides torque to the entire system, or hybrid operation, wherein some of the torque is absorbed or additionally provided by the motor/generator 102.

In this configuration, the electromagnet 39 is deactivated and, therefore, the coupling portion 32 is kept in the position where it is operationally connected to the actuating portion 33 by the force of the elastic means 37.

In a first operation phase, called the "driving mode" and constituting the normal pulley 1 operation mode, when the drive shaft 101' is driving the belt 107, the speed of the hub 2 tends to exceed the speed of the crown 3. Therefore, the spokes 31 of the actuator 30, once having exceeded the free angle $\alpha$ constituted, as described above, by the sum of the angular play $\sigma$ between the spokes 31 and the elastic groups 20 and of the angular travel x of the latter, transmit the torque to the projections 16, 17 with the interposition of the corresponding elastic groups 20 that therefore define a transmission characteristic of the pulley 1.

What has been stated for the driving mode occurs symmetrically in the condition, called "overrunning", in which the speed of the crown 3 tends to exceed the speed of the hub 2.

In the second condition in which the coupling portion 32 is operationally separated from the actuating portion 33, the torque between hub 2 and crown 3 cannot be transmitted. This condition may be useful if it is desired to operate the system 100 in a purely/mainly electric mode in which, i.e., the internal combustion engine 101 is switched off, or idling, and the electric motor/generator 102 provides torque to the system 100.

In this configuration, the electromagnet 39 is activated and, thus, the coupling portion 32 is attracted by the electromagnetic force exerted by the electromagnet 39 so as to overcome the force of the elastic means 37. This force is such that it compresses the elastic means 37 and carries the coupling portion 32 to the position near the flange 2c so as to decouple the splined coupling 36 and, thus, disconnect from the actuating portion 33.

The control of the actuating means is achieved by means of the electronic unit 40 that processes the data received from the motor/generator 102, the functional element 103, and the internal combustion engine 101 to control the actuating means 38, and thus the electromagnet 39.

According to the invention, the electronic unit 40 processes data received from the angular sensor means 50 and/or the torque sensing means 110 according to the methods described below to enable coupling and decoupling between the two portions 32, 33 of the actuator 30.

Figure 9:
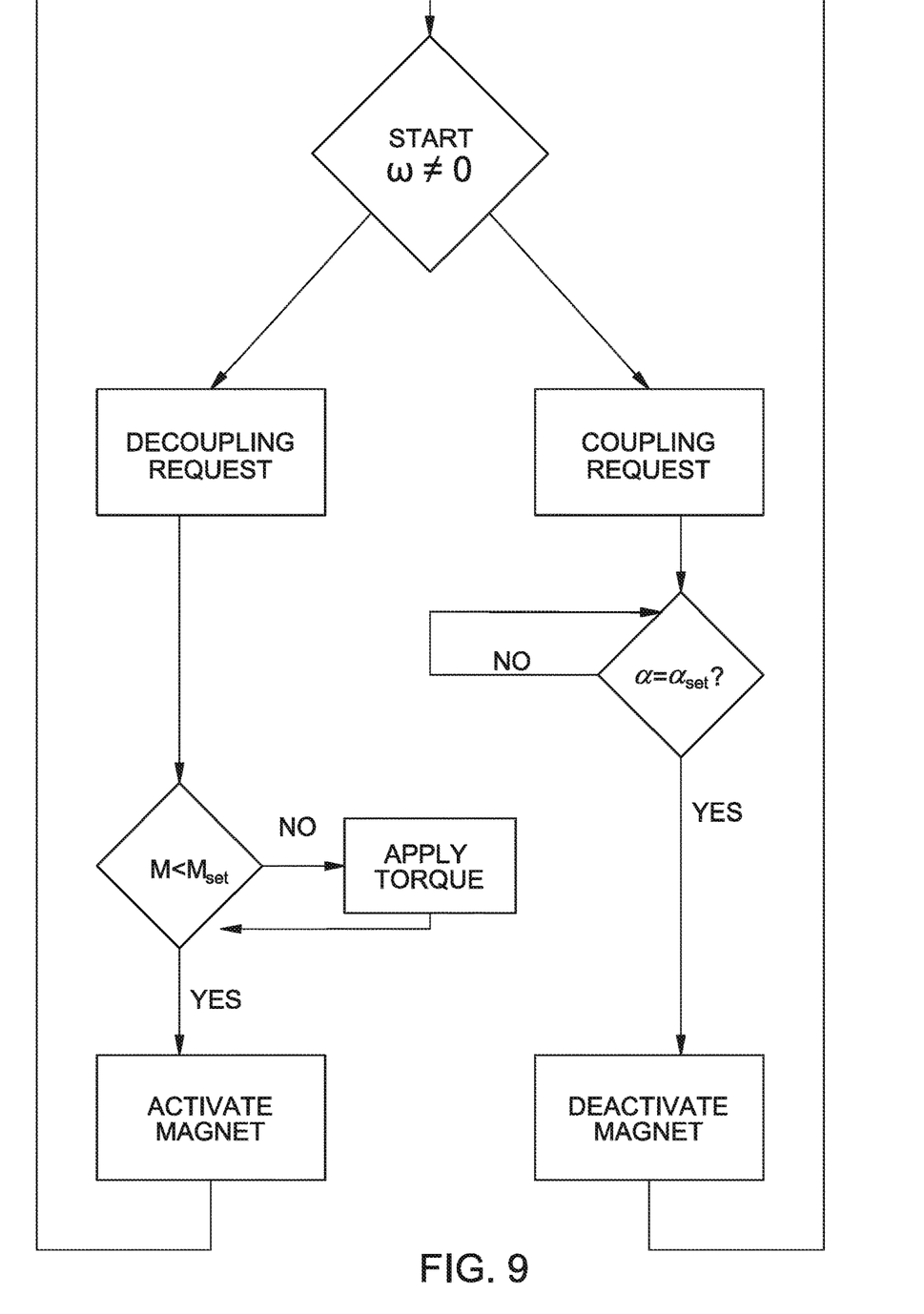
FIG. 9 schematically represents a flow chart representing methods for controlling the pulley in FIG. 2 in a first operating condition of the transmission system.

A first method, schematically illustrated in FIG. 9, relates to a control when the speed @ of the internal combustion engine is not zero.

Assuming that the pulley 1 is decoupled, the coupling of the pulley 1 is required, for example, when the user (or the electronic unit 40 automatically processing vehicle usage data) wants to switch from a purely electric use of the transmission system 100, to a hybrid use, or to being totally driven by the internal combustion engine 101.

An example of a full drive operating condition using the internal combustion engine 101 is illustrated in FIG. 2 in which the internal combustion engine provides a torque M1 while the motor-generator 102 absorbs a torque M2 and the functional element a torque M3. As known, the pulling torque M1 is greater than the sum of the resisting torques M2 and M3 so that the torque is transmitted by the belt 107 cooperating with the different pulleys 1, 104, 105. The torques M1, M2, and M3 are measured using torque sensing means 110.

In this condition, the first torque M1 is clearly greater than the other two torques M2, M3 and it is, therefore, essential to make the coupling between the two portions 32, 33 of the actuator 31 take place in the most favourable position. This requirement is obviously essential in a shape coupling such as the splined coupling 36 described for the portions 32, 33 to avoid interference in the coupling.

In particular, the angular sensor means 50 detect the relative angular position x of the crown 3 with respect to the hub 2, which value is acquired by the electronic unit 40. The latter comprises, stored in a memory, one or more fixed angular position values asset. The electronic unit 40 is configured to compare the value acquired by the angular sensor means 50 and compare this value with the one or more fixed angular position values asset. If this value corresponds, within a certain tolerance range, to the fixed value, then the electronic unit 40 controls the actuating means so as to command the coupling of the pulley 1, that is, in the example described, the deactivation of the magnet. If this value is not the correct value, then the electronic unit 40 continues to detect and compare the angular position of the pulley 1 until reaching a consistent position in order to activate the actuating means.

At this point, the method returns to its starting position to begin a new cycle. Assuming, therefore, that the pulley 1 is in a coupled condition, as first controlled by the unit 40, decoupling of the pulley 1 is required, for example, when the user (or the electronic unit 40 automatically processing vehicle usage data) wants to switch from being totally driven by the internal combustion engine 101 or a hybrid use to a purely electric use of the transmission system 100.

An example of a full drive operating condition, using the internal combustion engine 101, is illustrated in FIG. 3 in which the internal combustion engine provides a residual torque M1 while the motor-generator 102 contributes a starting torque M2 and the functional element absorbs a torque M3. As known, the pulling torque M1 and M2 is greater than the resisting torque M3 so that the torque is transmitted by the belt 107 cooperating with the different pulleys 1, 104, 105. The torques M1, M2, and M3 are measured using torque sensing means 110.

In this condition, the torque M1, although residual, is clearly such that decoupling between the two actuator 31 portions 32, 33 is difficult due to the residual torque being transmitted between them.

In particular, the torque sensing means 110 detect the torque M1 on the shaft 101' as well as the values of the torques M2 and M3 on the shafts 102', 103'. All these values are acquired by the electronic unit 40 that comprises, stored in a memory, a fixed allowable torque value Mset. The electronic unit 40 is configured to compare the acquired value M1 with this fixed allowable torque value Mset. If this value is smaller, within a certain tolerance range, than the fixed value, then the electronic unit 40 controls the actuating means so as to decouple the pulley 1, i.e., in the case described, so as to activate the magnet.

If this value is not smaller, then the electronic unit 40 is configured to control at least either the functional element 103 and/or the motor/generator 102 to modify the torque M3, M2 respectively provided so that the balance between the torques M1, M2, and M3 is basically zero. In this, basically instantaneous moment, the torque transmitted between the two portions 32, 33 of the actuator 31 is basically zero. In this moment, since the detected torque M1 is clearly less than Mset, then the actuating means, i.e., the magnet 39, can be activated.

Clearly, the above statement is also valid when the torque M1 is resisting torque, inverting the sign of the remaining torques, according to the operation of the same and of the number of functional elements 103 present in the system 100.

Figure 10:
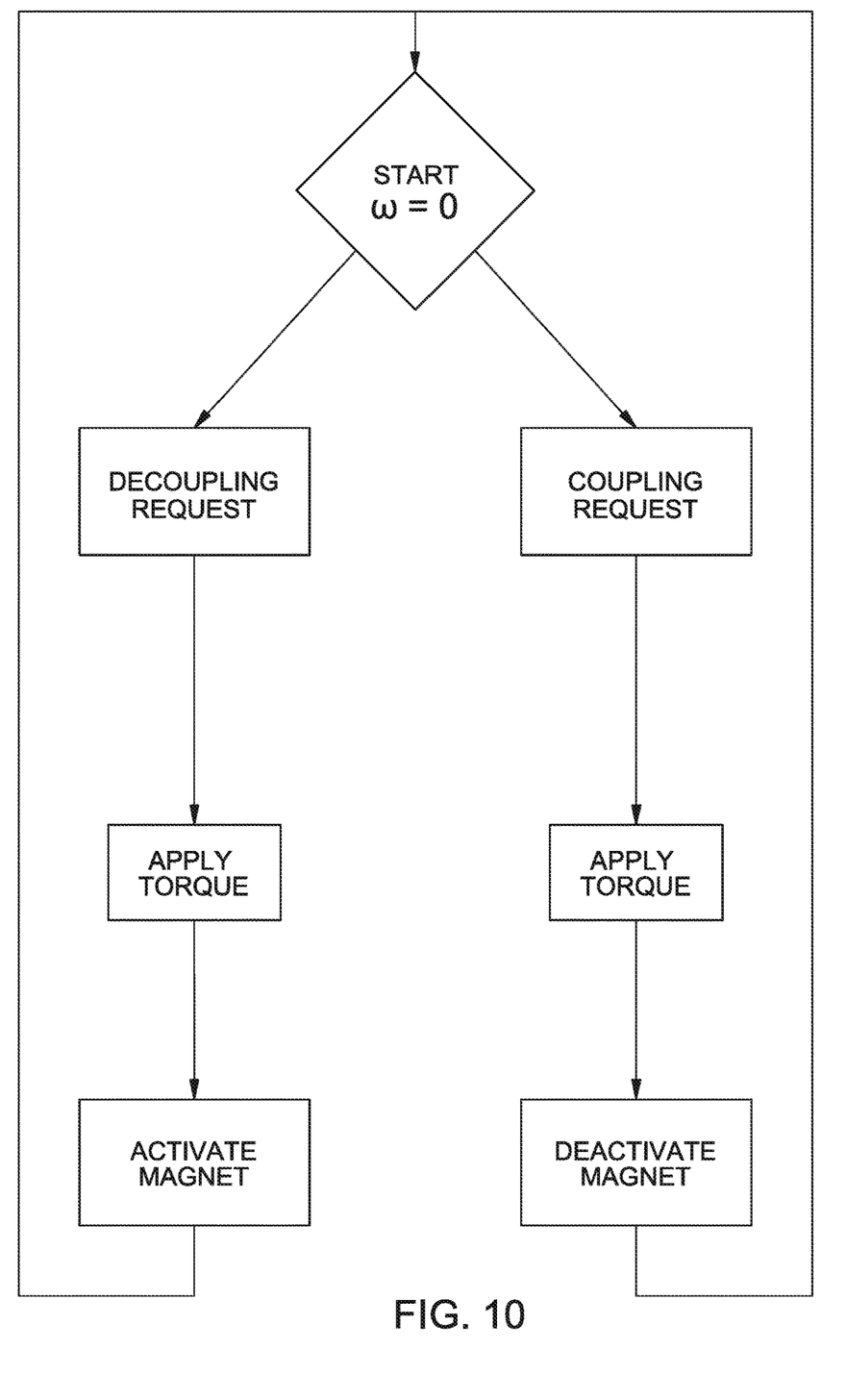
FIG. 10 schematically represents a flow chart representing methods for controlling the pulley in FIG. 2 in a second operating condition of the transmission system.

A second method, schematically illustrated in FIG. 10, relates to a control when the speed @ of the internal combustion engine 101 is zero, as well as that of the motor-generator 102 and, therefore, of the entire system 100.

Assuming that the pulley 1 is in a decoupled condition, the coupling of the pulley 1 is required, for example, when the user (or the electronic unit 40 automatically processing vehicle usage data) wants to switch from purely electric use of the transmission system 100 to a hybrid use or one totally driven by the internal combustion engine 101.

In this condition, the teeth for engaging the actuator 30 portions 32, 33 may not be properly aligned for the corresponding portion between the pulley 2 and motor 3. The electronic unit 40 then controls the motor-generator 102 so that it provides a slight torque oscillation to the belt 107, enough to move its pulley 105 by a small angular range, such as plus or minus 5°-10° with respect to the rest position. At the same time, the electronic unit 40 controls the actuating means so as to control the pulley 1, that is, in the example described, to deactivate the magnet. Due to the movement taking place between the portions 32 and 33, the probability of a correct engagement is increased, if the pulley 1 is not provided with angular sensor means 50.

At this point, the method returns to its starting position to begin a new cycle. Assuming, therefore, that the pulley 1 is in a coupled condition, as first controlled by the unit 40, decoupling of the pulley 1 is required, for when the user (or the electronic unit 40 example, automatically processing vehicle usage data) wants to switch from being totally driven by the internal combustion engine 101 or from the hybrid use to a purely electric use of the transmission system 100.

In this condition, the teeth engaging the portions 32, 33 of the actuator 30 may be in a load condition such that the force generated by the actuating means would not be sufficient to disengage them.

The electronic unit 40 then controls the motor-generator 102 so that it provides a slight torque oscillation to the belt 107 so that it moves its pulley 105 by a small angular range, such as plus or minus 5°-10° with respect to the rest position. At the same time, the electronic unit 40 controls the actuating means so as to command the decoupling of the pulley 1, that is, in the example described, the deactivation of the magnet, in particular, during reversal of the oscillating torque provided by the motor-generator 2. Due to the activation along with the torque oscillation provided by the motor-generator 2, the residual torque in the engagement of the actuator 30 portions 32, 33 can be minimised, thereby enabling them to be easily decoupled.

The advantages of a pulley 1 according to the invention thus become apparent.

Due to the pulley 1 described above, it is possible to decouple and couple the crown 3 with respect to the hub 2 in a compact, stable, and fast way, but, above all, according to the operating conditions of the system 100, optimising the coupling and decoupling moment.

In particular, it is possible to decouple the pulley 1 avoiding sliding or friction because the pulley 1 is still transmitting torque between the crown 3 and the hub 2, both when the belt 107 is transmitting torque to the various elements of the transmission 100 and when it is stationary and, therefore, there is no transmission of torque/rotation between these elements.

On the other hand, it is possible to engage the pulley 1 avoiding friction or failed shape couplings between the two portions 32, 33 of the hub 31, according to the best relative position between the crown 3 and the hub 2.

Lastly, it is clear that modifications and variations may be made to the pulley 1 described without departing from the scope of protection defined by the claims.

It is clear that the form of the elements described may vary within the limits of the claims included below. It is likewise clear that the two portions 32, 33 may be coupled using different coupling mechanisms such as clutches or other shape couplings.

In addition, as mentioned above, the system 100 may comprise additional elements to those claimed or more pulleys according to this invention.

The invention claimed is:

1. A filtering pulley comprising:
a hub configured to be fixed to a shaft rotating around an axis,
a crown mounted coaxial and rotationally free on said hub,
a plurality of elastic groups arranged circumferentially with respect to said hub and said crown and interposed, each, between a pair of first elements integral to said hub and between a pair of second elements integral to said crown, said first elements including at least two spokes, carried by an actuator, said actuator including a coupling portion carried by said hub and an actuation portion defining said spokes carried by said crown, said pulley including coupling means configured to allow a selective coupling of said coupling portions and actuation portion to define a first configuration in which they cooperate so that said crown is operationally connected to said hub and a second configuration in which they are operatively separated so that said crown is operationally disconnected from said hub, and
actuating means configured to control said coupling means and sensor means configured to detect a relative angular position of said crown with respect to said hub, said actuating means controlling said coupling means on the basis of said relative angular position.

2. The filtering pulley according to claim 1, wherein said sensor means includes an encoder.

3. The filtering pulley according to claim 1, wherein said coupling means includes a form coupling.

4. The filtering pulley according to claim 3, wherein these coupling means includes a splined coupling.

5. The filtering pulley according to claim 3, wherein said coupling portion and said actuation portion define between them a splined coupling gearing according to the position of said portion of coupling with respect to said hub.

6. The filtering pulley according to claim 1, wherein said actuation means includes an electromagnet.

7. The transmission system for a vehicle comprising:
an internal combustion engine and at least one electric engine/generator, each comprising a respective pulley configured to cooperate with an endless transmission element to transmit torque between the said internal combustion engine and at least one electric engine/generator,
at least said pulley of said internal combustion engine comprising:
a hub configured to be fixed to a shaft rotating around an axis,
a crown mounted coaxial and rotationally free on said hub,
a plurality of elastic groups arranged circumferentially with respect to said hub and said crown and interposed, each, between a pair of first elements integral to said hub and between a pair of second elements integral to said crown,
wherein said first elements include at least two spokes, carried by an actuator, said actuator including a coupling portion carried by said hub and an actuator portion defining said spokes carried by said crown,
wherein said pulley of said internal combustion engine includes coupling means configured to allow a selective coupling of said coupling portions and said actuator portion to define a first configuration in which they cooperate so that said crown is operationally connected to said hub and a second configuration in which they are operationally separated so that said crown is operationally disconnected from said hub, and said pulley of said internal combustion engine includes actuating means configured to control said coupling means, and
torque sensing means configured to detect the torque transmitted by said internal combustion engine and at least one electric engine/generator, and an electronic unit electrically connected to said torque sensing means and configured to control said actuating means on the basis of the values detected by said torque sensing means and/or sensor means configured to detect a relative angular position of said crown with respect to said hub, said actuating means controlling said coupling means on the basis of said relative angular position.

8. The system according to claim 7, comprising at least one functional element including a respective pulley configured to cooperate with said endless transmission element to transmit torque between said internal combustion engine and at least one electric engine/generator, said system including additional torque sensor means configured to further detect the torque transmitted by said functional element.

9. The system according to claim 8, in which the torque sensor means and the additional torque sensor means include a torque transducer.

10. A method of controlling a pulley of a system according to claim 7, in which said endless element is in motion to transfer torque between the elements of the system including the phases of:
  receiving a request for coupling of said crown to said hub;
  detecting a relative position of said crown with respect to said hub;
  assessing whether this relative position is equivalent to a fixed value;
  if not, repeating the previous assessment step again, if positive checking these actuating means to couple this crown to this hub.

11. The method according to claim 10, wherein checking the actuating means includes a deactivation phase of said electromagnet.

12. The method of controlling a pulley of a system according claim 7, in which said endless element is moving to transfer torque between the elements of the system, including the phases of:
  receiving a request to decouple said crown to said hub;
  detecting the torques (M1, M2, M3) on said pulleys of said transmission;
  assessing whether this torque value (M1) on said pulley is less than a fixed value;
  if so, checking the actuating means to decouple that crown to that hub,
  in the negative case, processing a torque value (M2, M3) for the at least one electric engine/generator and the at least one functional element and their respective connected pulleys and checking at least one of the at least one electric engine/generator and the at least one functional element respective pulleys to provide this predetermined torque value (M2, M3) and return to the previous valuation step.

13. The method according to claim 12, wherein checking the actuating means includes a deactivation phase of said electromagnet.

14. The method of controlling a pulley of a transmission system for a vehicle comprising an internal combustion engine and at least one electric engine/generator, each comprising a respective pulley configured to cooperate with an endless transmission element to transmit torque between the said internal combustion engine and at least one electric engine/generator, at least said pulley of said internal combustion engine comprising a hub configured to be fixed to a shaft rotating around an axis, a crown mounted coaxial and rotationally free on said hub, a plurality of elastic groups arranged circumferentially with respect to said hub and said crown and interposed, each, between a pair of first elements integral to said hub and between a pair of second elements integral to said crown, said first elements including at least two spokes, carried by an actuator, said actuator including a coupling portion carried by said hub and an actuator portion defining said spokes carried by said crown, said pulley including coupling means configured to allow a selective coupling of said coupling portions and actuator portion to define a first configuration in which they cooperate so that said crown is operationally connected to said hub and a second configuration in which they are operationally separated so that said crown is operationally disconnected from said hub,
  in which said endless element is not in motion to transfer torque between said elements of said system, said method comprising the steps of:
    receiving a request to decouple said crown to said hub;
    checking said motor-generator to provide an oscillating torque value in a predetermined torque range;
    checking said actuating means to decouple or couple said crown to said hub while said motor-generator provides said oscillating torque value.

15. The method according to claim 14, in which said control of said actuating means occurs during a reversal of the oscillating torque value provided by said motor-generator.

\* \* \* \* \*